Jan. 12, 1960 R. M. RINGOEN 2,921,188

SINGLE SIDEBAND DIVERSITY SYSTEM

Filed Oct. 17, 1956 3 Sheets-Sheet 1

INVENTOR.
RICHARD M. RINGOEN
BY Moody and Harsha
ATTORNEYS

Jan. 12, 1960 R. M. RINGOEN 2,921,188

SINGLE SIDEBAND DIVERSITY SYSTEM

Filed Oct. 17, 1956 3 Sheets-Sheet 2

INVENTOR.
RICHARD M. RINGOEN
BY Moody and Harcho
ATTORNEYS

INVENTOR.
RICHARD M. RINGOEN
BY Moody and Harder
ATTORNEYS 2,921,188

SINGLE SIDEBAND DIVERSITY SYSTEM

Richard M. Ringoen, Cedar Rapids, Iowa, assignor to Collins Radio Company, Cedar Rapids, Iowa, a corporation of Iowa Application October 17, 1956, Serial No. 616,508

6 Claims. (Cl. 250—20)

This invention relates to single sideband transmission systems and more particulary to single sideband diversity receivers.

A common type diversity reception system which has been utilized prior to this invention is of the switching type. In this type of diversity reception, the noise output from at least two receivers is measured and the output of the receiver having the lesser noise output is then selected by switch mechanisms. In high frequency systems, the gains of the receivers are generally controlled automatically by the transmitted signal, i.e., the transmitted signal is normally used to control the automatic gain control voltage. In amplitude modulated circuits, the diversity receivers have generally been so connected that the outputs of the receivers are combined. This combination is normally done by paralleling the outputs of the final detectors of the receivers, using a common diode load resistor. Additionally, the automatic gain control circuits of each receiver are closely interlocked.

The development of a voice diversity reception system for use in conjunction with very high frequency (VHF) scatter has brought about the subject invention. For VHF scatter the fading rate at times will approach the syllabic rate of normal speech and at times will exceed it. Therefore, it is not possible to utilize the intelligence transmitted as a reference for automatic gain control because the time constant of the gain control circuitry would have to be much greater than the fading rate in order not to remove the normal voice power variations. Therefore, some other method of obtaining an automatic gain control (AGC) voltage must be incorporated in VHF single sideband equipment for voice transmission.

All switch-type diversity systems have a transient associated with them. It is impossible to hold the receiver gains constant enough and so design a switching circuit such that the output level will not vary during the switching period. On high frequency (HF) systems and on microwave systems this is not too detrimental since the fading rate is generally very slow so that switching transients will occur only infrequently.. However, at ultra high frequency (UHF) and VHF scatter techniques the fading rates may be several cycles a second.

Ideally the diversity reception equipment for single sideband voice transmission should then incorporate an AGC system which is not dependent upon the amplitude of the voice reception and also which is free of switching transients.

It is an object of this invention to provide optimum diversity reception in single sideband voice transmission.

It is a further object of this invention to provide diversity reception in single sideband transmission systems without adverse transient effects. It is another object of this invention to provide a simple diversity reception system for single sideband voice transmission systems.

It is a still further object of this invention to provide diversity reception systems which will accommodate triple, quadruple, and higher orders of diversity reception.

In accordance with the invention there is provided a single sideband diversity receiving system in which the transmitted signal contains a pilot signal and a sideband. The system comprises a plurality of receivers each constructed to produce demodulated signals of substantially equal gain and phase in response to the transmitted signals, and combining means constructed to combine the demodulated signals of the plurality of receivers to produce a combined demodulated signal having an optimum signal-to-noise ratio. Each of the receiving means comprises means for intercepting and converting the transmitted signal to an intermediate frequency signal, means for extracting the pilot signal from the intermediate frequency signal, and means for producing from said pilot signal an AGC voltage for the receiver. Each of the receivers further comprises an oscillator means whose output signal is phase locked with the intermediate pilot signal, and means for mixing the output signal of the oscillator with the converted signal to produce a demodulated signal in which the phase shifts of the transmitted sideband signal caused by the transmission medium are cancelled out. The phases and the amplitudes of the output signals of the two receivers are thus caused to be equal.

Means are provided for selectively filtering a portion of the bandwidth of the demodulated signal of each receiver to produce a noise level indicating signal whose amplitude varies as the noise level of said demodulated signal. It is to be noted that since the amplitudes of the output signals of the two receivers are about equal, the noise level of the two signals will give a direct indication of the signal-to-noise ratio of the two output signals. The aforementioned combining means are constructed to be responsive to said noise level indicating voltages of the receivers to combine the demodulated (output) signals of the receivers to produce a resultant output signal having an optimum signal-to-noise ratio.

In accordance with a feature of the invention the extracted intermediate pilot signal is mixed with another signal having a given frequency to produce a resultant signal having a new frequency. The output signal of the oscillator means is then phase locked with said resultant signal and is mixed with the converted sideband signal to produce a demodulated signal at a second intermediate frequency level. This demodulated signal is then supplied to the combining circuit.

The above mentioned and other objects and features of the invention will become more apparent from the following detailed description thereof when read in conjunction with the figures in which.

Figure 1:
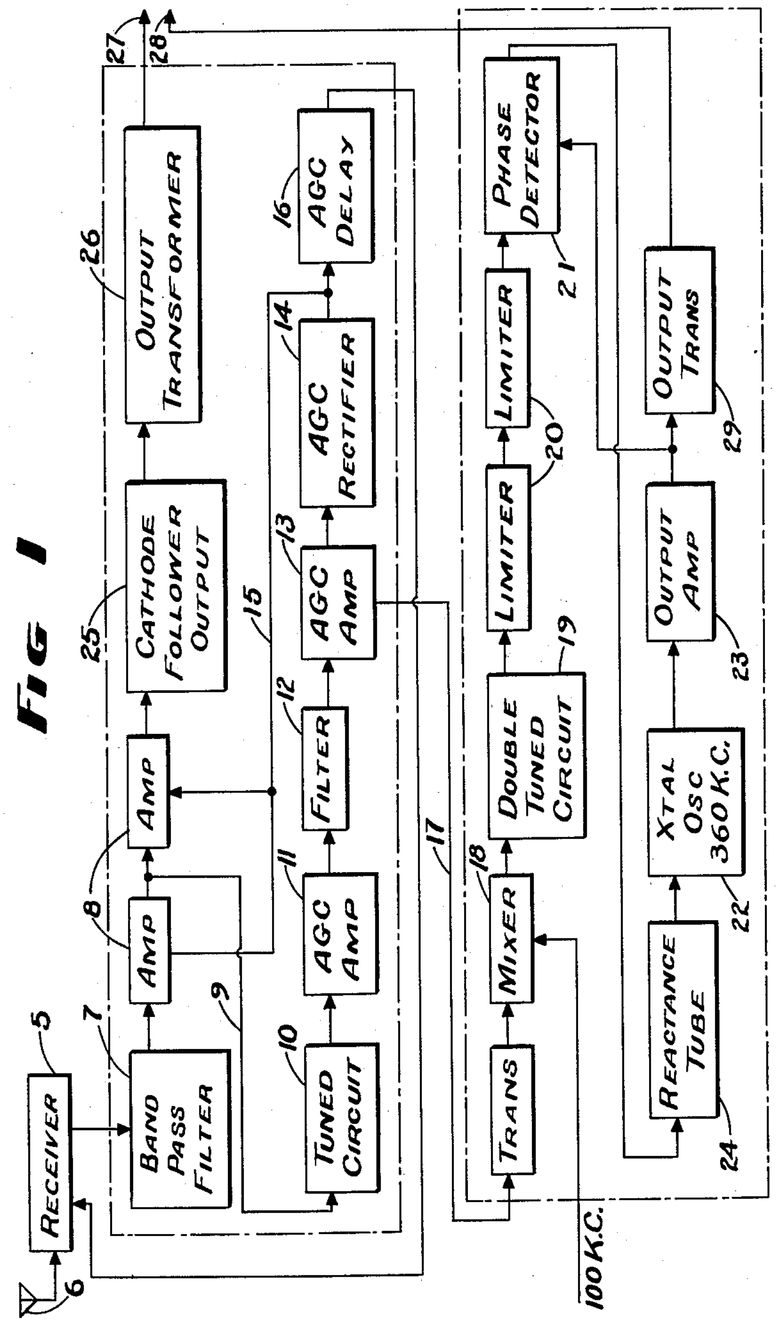
Figure 1 is a schematic diagram of a portion of the amplifiers and oscillator units of a single sideband transmission system.

Referring now to Figure 1, the receiver 5 receives the input signals from the antenna 6. These signals are converted to the base band frequency by the receiver 5. Baseband frequency as used herein is defined as the frequency bandwidth of the signal being processed. Bandpass filter 7 rejects all out of band signals. This base band has a frequency of 240 to 260 kilocycles in a particular embodiment of this invention. The signals from the filter 7 are fed into the amplifiers 8. There are only two stages of amplification shown in Figure 1; however, in a specific embodiment of this invention which was constructed, four stages of gain were used to amplify the signals from the bandpass filter 7. It must be realized that the signals from the bandpass filter 7 contain both the intelligence signal and the reference signal which is a direct derivative of the pilot signal and may be referred to as the intermediate frequency pilot signal. The amplifying stages are all provided with automatic gain control. The reference signal, which is the 260-kilocycle signal in the embodiment of this invention, is applied after the necessary amplification to the input of the automatic gain control amplifier. This signal is applied through lead 9 to the tuned circuit 10. The output signal from the tuned circuit 10 is applied to the automatic gain control amplifier 11, where it is amplified and passed through the filter 12 to another amplifier 13. In one embodiment of this invention which was constructed, the filter 12 was a mechanical filter and was used to eliminate all other base band signals. The reference signal is then detected in the rectifier 14 and connected to the amplification stages comprising amplifiers 8 through the lead 15. The automatic gain control voltage is applied also to the AGC delay 16 which functions to protect the system against sudden large surges of energy.

The reference signal output from the output of the automatic gain control amplifier 13 is also applied to a carrier oscillator module for heterodyning purposes through lead 17. The reference signal is heterodyned in mixer 18 with the 100-kilocycle signal from a separately-generated frequency source. It is to be remembered that the frequency from the automatic gain control amplifier 13 has a frequency of 260 kilocycles in one embodiment of this invention. The output from the mixer 18 is then 360 kilocycles in one embodiment of this invention. This signal is then amplified and limited in the double-tuned circuit 19 and the limiters 20 of this invention. The 360-kilocycle reference signal is then applied to phase detector 21, where it is compared in phase with the phase of the crystal oscillator 22, the output signal from the oscillator 22 having been amplified in amplifier 23 and applied to the phase detector 21. Any difference in phase between the reference signal and the 360-kilocycle crystal oscillator signal is fed through an automatic frequency control loop, including reactance tube 24, to produce a phase lock between the two signals. Thus, after amplification and isolation, a 360-kilocycle signal is obtained in the output transformer 29, which is phase-locked to the 360-kilocycle reference signal in the output of mixer 18. The signal from the amplifiers 8 is fed to a cathode follower output element 25 and to an output transformer 26 from where it is fed out on lead 27. The signal on lead 27 is thus the base band output from receiver 5.

Lead 28 then has the 360-kilocycle reference signal which has been generated in the carrier oscillator. The leads 27 and 28 are connected to the group modulator 31, shown in Figure 2. The group modulator mixes the two signals to produce a resultant signal having a band width of from 100 to 120 kilocycles. The frequency components of this new base band have a phase essentially independent of any path length changes in the medium and also have a constant system gain due to the tight automatic gain control system. Such phase essentially is independent of any changes in the transmission medium since both the 360 kilocycle reference signal and the information bearing sideband signal appearing on the lead 27 have substantially the same shift in phase caused by the transmission medium. When the aforementioned two signals are mixed together, such shifts in phase will not appear in the resultant beat frequency signals inasmuch as the beat frequency signals are equal to the difference of the frequencies and phase shifts of the two applied signals. Similarly, phase shifts in the signals received by the other receiver are removed so that the output signals of the group modulators of the two receivers are in phase with each other.

Figure 2:
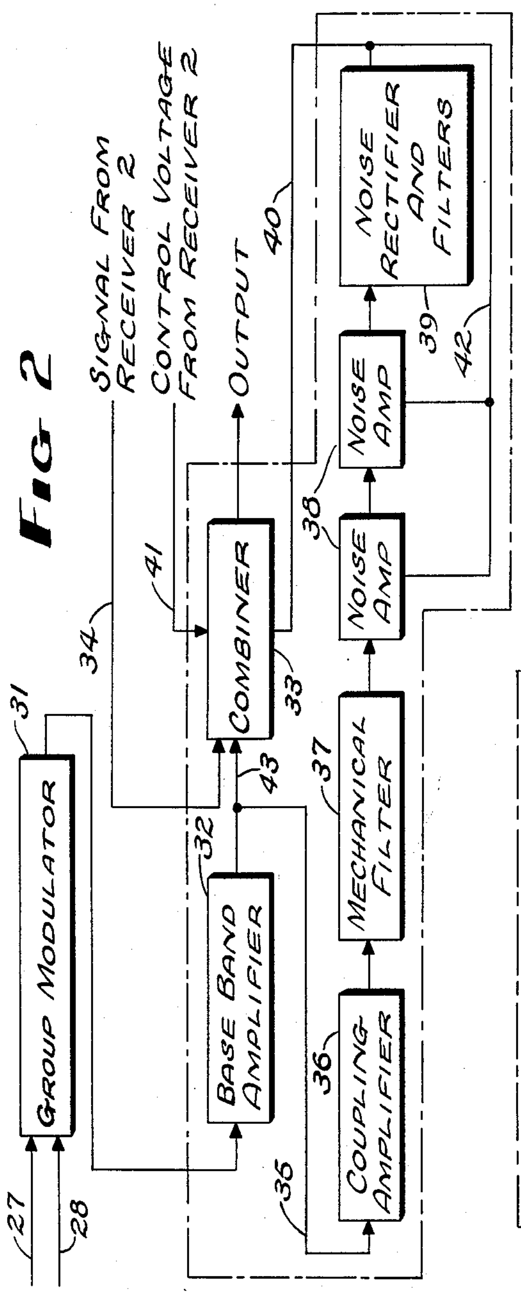
Figure 2 is a block diagram of one embodiment of the diversity combiner system of this invention.
Figure 3:
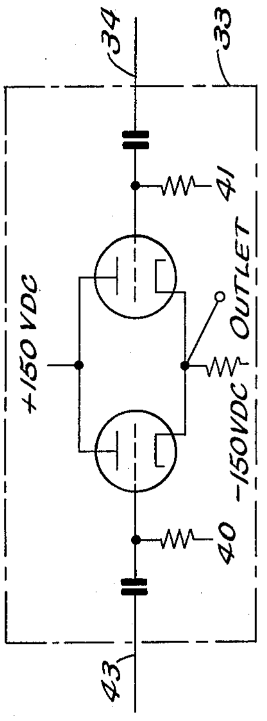
Figure 3 is a schematic diagram of one embodiment of the combiner element of this invention.

The output signal of the group modulator then is supplied to the baseband amplifier 32. The new base band frequency is then fed into the base band amplifier 32. The output signal from the base band amplifier 32 is fed into the combiner 33. Additionally, into the combiner 33 is an identical signal generated in a second identical system and applied on lead 34. The signal from the base band amplifier 32 is also fed by lead 35 to a coupling amplifier 36. The noise measured in a small band, namely four kilocycles, and in a specific embodiment of this invention measured between 116 and 120 kilocycles, may be used as a direct indication of the direct signal-to-noise ratio of the receiver inasmuch as the system gain is constant. This particular band is void of any intelligence signals. The noise band in which no intelligence signals appear is selected by the mechanical filter 37, amplified and rectified in the noise rectifier and filter 39 to produce a control voltage proportional to the noise magnitude. This rectified noise voltage is then applied through lead 40 to the combiner 33. This rectified noise voltage is applied in series with the 100–120 kilocycle base band signal to the grid of the cathode follower combiner 33, as shown in Figure 3. The corresponding signals in the other receiver are applied to the grid of the other cathode follower in combiner 33 by lead 41. The two cathode followers have a common control which is connected to a negative 150 volts D.C. As the signal-to-noise ratio in one of the receivers decreases due to fading, the increase in the level of the rectified noise signal (the noise level indicating signal) will be supplied to the corresponding conductor 40 or 41 in Fig. 3. Assume specifically that such noise level indicating signal is supplied to conductor 40. This will tend to decrease the conductivity of the left hand tube of Fig. 3 which will tend to decrease the common cathode potential, which then in turn will tend to increase the gain of the right hand tube of Fig. 3. Thus it can be seen that as one of the received signals fades its contribution to the output signal of the combiner circuit of Fig. 3 will be decreased in accordance with the degree of fading. Concurrently with a decrease in contribution of one of the receivers to the output of the combiner circuit the contribution of the other receiver to the output of the combiner circuit will increase. For optimum combining, the voltage gain of the cathode follower in a specific receiver should be proportional to the noise power output of the receiver. As is shown in Figure 2, automatic gain control is applied by lead 42 around the noise amplifiers to provide this characteristic.

With some decrease in quality of performance, the outputs of limiters 20 could be used directly as the group demodulation frequency. This form of reinserted carrier would eliminate the oscillator 22 and its associated circuit.

Figure 4:
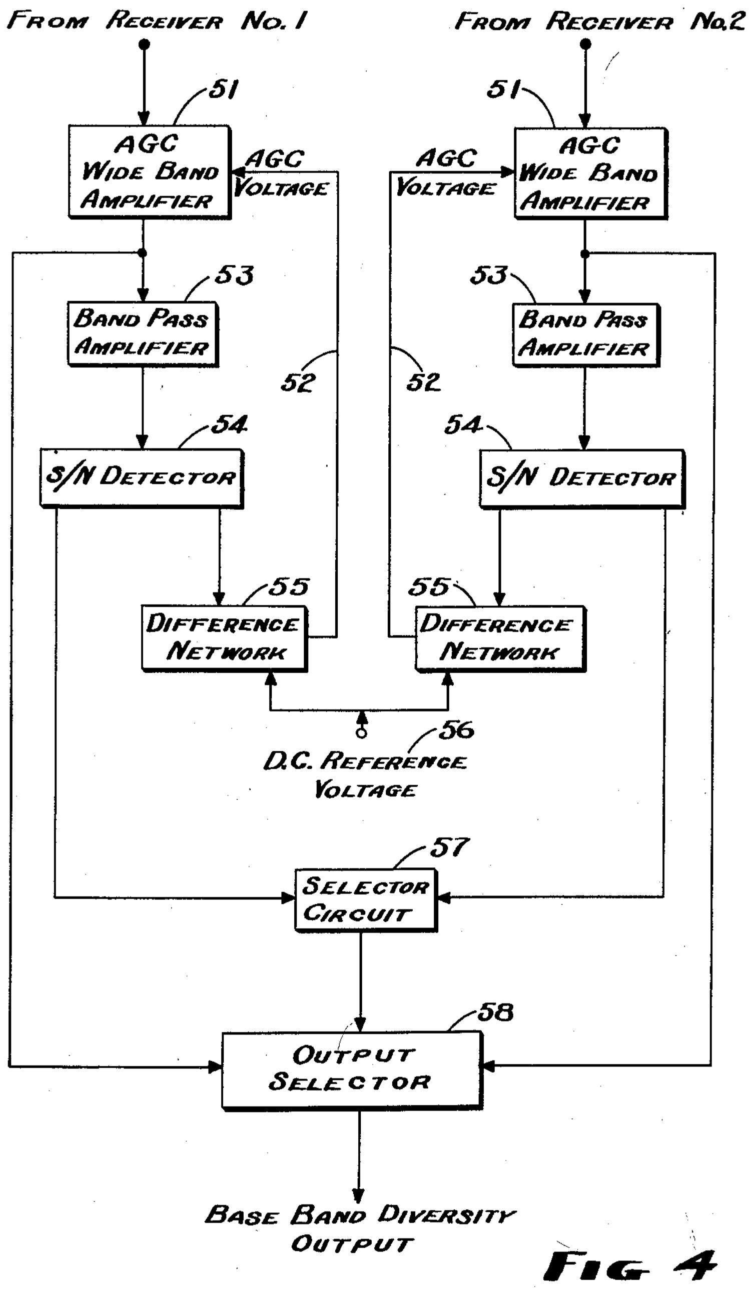
Figure 4 is a block diagram of another embodiment of the diversity combiner system of this invention.

Another diversity combiner system for dual diversity reception over scatter propagation system is shown in the block diagram of Figure 4. This combiner system receives the output signals of a group heterodyne unit which is gain stabilized but which is not necessarily phase stabilized. These signals are fed into the variable gain amplifiers 51. Amplifier 51 has an external gain control voltage injection on leads 52 from the difference networks 55. The output of the individual amplifier 51 is applied to a bandpass amplifier 53 employing a very narrow filter tuned to the pilot tone or reference signal frequency. The transmitted tone level or reference signal is proportional to the amount of power transmitted in each intelligence channel. Therefore, if this reference tone is used in the receiver to establish the receivers output level and keep it constant, both the action of the automatic load control unit in the transmitter and the action of the variable attenuation in the propagation medium will be eliminated. The output of the bandpass amplifier is applied to a signal-to-noise detector 54. This detector effectively measures the amount of noise power in the bandpass amplifier 53. The detector also measures the power contained in the reference signal and produces an output signal proportional to the ratio between the noise power and the reference signal power. The reference signal may be as much as 30 decibels down from the power transmitted in the voice channel and with this invention will still operate satisfactorily. The signal-to-noise detector circuit 54 also produces an output proportional to the reference signal amplitude. This is a direct current output and is subtracted in the difference networks 55 from the direct current reference voltage 56. This difference voltage generated by the difference networks 55 between the direct current reference voltage and the direct current signal proportional to the reference signal amplitude is applied to leads 52 to provide a gain control signal for the variable gain amplifiers 51. In this manner the automatic gain control acts to stabilize the gain of the system so that the output amplitude of the reference signal remains at a fixed level, which level bears a fixed relationship to the direct current reference voltage amplitude. Inasmuch as this is done in each diversity channel, the signal times gain in each diversity channel is stabilized to a constant value. Thus, the signal power at the output of each variable gain control amplifier 51 remains the same no matter what the gain of the receivers or the propagation losses may be.

The other output from the signal-to-noise detector 54 is applied to a selector circuit 57. This selector circuit compares the signal-to-noise in each channel as indicated by the signal-to-noise detector 54 and produces an output voltage to control the output selector of the system. This output signal or voltage is applied to the output selector 58. The output signal of each variable gain control amplifier 51 is also applied to the output selector 58. The output selector 58 in response to the signal from the selector circuit 57 transfers the receiver output having the best signal-to-noise ratio to the voice channel demodulators. In this embodiment, maintaining the signal level at the output of each automatic gain control amplifier stable means that very small switching transients will be experienced as the diversity selector acts to switch from one receiver to the other. This system may utilize compressors and expanders to reduce the inter-syllable noise while not affecting the dynamic range of the output signal with the resulting effective improvement in the signal-to-noise ratio for voice transmission.

This invention provides means for combining the outputs of two receivers in a scatter propagation transmission system so that automatic gain control may be utilized. Further, this invention provides means of improving the quality of the transmitted signal and further provides voice communication in predicted wave systems.

Although this invention has been described in respect to particular embodiments thereof, it is not to be so limited as changes and modifications may be made therein which are within the full intended scope of the invention.

What is claimed is:

1. In a single sideband diversity receiving system in which the transmitted signal contains a pilot signal and a sideband signal, a plurality of receiving means constructed to produce demodulated signals of substantially equal gain and phase in response to said transmitted signals, each of said receiving means comprising means for intercepting and converting the transmitted signal to an intermediate frequency signal, means for selectively extracting from the intermediate frequency signal that portion derived from said pilot signal, means responsive to the extracted signal to produce an automatic gain control voltage whose magnitude varies as the amplitude of said pilot signal, the receiving means constructed to be responsive to said automatic gain control voltage to maintain the amplitude of said demodulated signal at a near constant gain, oscillator means tuned to the frequency of said extracted signal, means for phase locking the output signal of said oscillator means with the phase of said extracted signal, means for mixing said output signal of said oscillator means with the converted signal to produce a demodulated signal in which the phase shifts of the sideband signal caused by the transmission medium and by the receiver are cancelled out, means for selectively filtering a portion of the bandwidth of said demodulated signal to produce a noise level indicating voltage whose amplitude varies as the noise level of said demodulated signal, and combining means constructed to be responsive to the demodulated signals and the noise level indicating voltages of said plurality of receivers to produce an output demodulated signal having an optimum signal-to-noise ratio.

2. A single sideband diversity receiving system in accordance with claim 1 in which said combining means comprises a plurality of electron discharge devices each having an anode, a control grid, and a cathode, a cathode load resistor common to said cathodes, a plurality of grid leak resistors for individually supplying the noise level indicating voltages of each of said plurality of receivers to individual ones of the control grids of said plurality of electron discharge devices, and a plurality of coupling capacitors for individually supplying the said demodulated signals to individual ones of said control grids of the plurality of electron discharge devices, the demodulated signal and noise level indicating voltage of any given receiver being supplied to the same electron discharge device.

3. In a single sideband diversity receiving system in which the transmitted signal contains a pilot signal and a sideband signal, a plurality of receiving means constructed to produce demodulated signals of substantially equal gain and phase in response to said transmitted signals, and combining means constructed to combine the demodulated signals of said plurality of receiving means to produce an output signal having a signal-to-noise ratio as good as the best instantaneous signal-to-noise ratio of the demodulated signals of any one of said plurality of receiving means, each of said receiving means comprising means for intercepting and converting the transmitted signal to an intermediate frequency signal, means for amplifying the converted signal, means for selectively extracting from the intermediate frequency signal that portion derived from said pilot signal, means responsive to said extracted signal to produce an automatic gain control voltage whose magnitude varies as the amplitude of said extracted signal, said amplifying means responsive to said automatic gain control voltage to maintain the amplitude of said converted signal at a near constant gain, oscillator means tuneable to the frequency of said extracted signal, means for phase locking the output signal of said oscillator means with the phase of said extracted signal, means for mixing said output signal of said oscillator means with the converted signal to produce said demodulated signal in which the phase shifts of the transmitted sideband signal caused by the transmission medium and by the receiver are cancelled out, means for supplying the demodulated signals of said plurality of receivers to said combining means, means for selectively filtering a portion of the bandwidth of said demodulated signals to produce noise level indicating voltages whose amplitudes vary as the noise level of said demodulated signals vary, said combining means constructed to be responsive to said noise level indicating voltages to combine said demodulated signals to produce a resultant demodulated signal having an optimum signal-to-noise ratio.

4. A single sideband diversity receiving system in accordance with claim 3 in which said plurality of receivers comprises first and second receivers and in which said combining means comprises first and second electron discharge devices each having an anode, a control grid, and a cathode, a cathode load resistor common to said cathodes, first and second grid leak resistors for supplying the noise level indicating voltages of said first and second receivers to the control grids of said first and second electron discharge devices respectively, and first and second coupling capacitors for supplying the said demodulated signals to said control grids of said first and second electron discharge devices respectively.

5. In a single sideband diversity receiving system in which the transmitted signal contains a pilot signal and a sideband signal, a plurality of receiving means constructed to produce demodulated signals of substantially equal gain and phase in response to said transmitted signals, each of said receiving means comprising means for intercepting and converting the transmitted signal to an intermediate frequency signal, means for amplifying the converted signal, means for selectively extracting from the intermediate frequency signal that portion derived from said pilot signal, means responsive to the extracted signal to produce an automatic gain control voltage whose magnitude varies as the amplitude of said pilot signal, each receiving means constructed to be responsive to the said automatic gain control voltage produced therein to maintain the amplitude of the demodulated signal at a near constant gain, means common to all of said plurality of receivers for generating a second signal of a given frequency, means for mixing said second signal with said extracted signal to produce a third signal having a different frequency from said given frequency, an oscillator means tuned to said different frequency, means for phase locking the output signal of said oscillator means with the phase of said third signal, means for mixing said output signal of said oscillator means with said converted signal to produce a demodulated signal in which the phase shifts of the transmitted sideband signal caused by the transmission medium and by the receiver are cancelled out, means for selectively filtering a portion of the bandwidth of said demodulated signal to produce a noise level indicating voltage whose amplitude varies as the noise level of said demodulated signal, and combining means constructed to be responsive to the demodulated signals and the noise level indicating voltages of said plurality of receivers to produce an output demodulated signal having an optimum signal-to-noise ratio.

6. A single sideband diversity receiver system in accordance with claim 5 in which said plurality of receivers comprises first and second receivers and in which said combining means comprises first and second electron discharge devices each having an anode, a control grid, and a cathode, a cathode load resistor common to said cathodes, first and second grid leak resistors for supplying the noise level indicating voltages of said first and second receivers to the control grids of said first and second electron discharge devices respectively, and first and second coupling capacitors for supplying the said demodulated signals to said control grids of said first and second electron discharge devices respectively.

References Cited in the file of this patent

UNITED STATES PATENTS

| | | |
|---|---|---|
| 1,747,221 | Brown | Feb. 18, 1930 |
| 2,293,565 | Schock | Aug. 18, 1942 |
| 2,510,889 | Hollingsworth | June 6, 1950 |
| 2,555,557 | Peterson et al. | June 5, 1951 |
| 2,698,904 | Hugenholtz | Jan. 4, 1955 |
| 2,835,799 | Day | May 20, 1958 |

FOREIGN PATENTS

| | | |
|---|---|---|
| 663,664 | Great Britain | Dec. 27, 1951 |